United States Patent [19]

Elder

[11] Patent Number: 5,111,611
[45] Date of Patent: May 12, 1992

[54] CHRISTMAS TREE STAND AND IRRIGATION DEVICE

[76] Inventor: Wilson Elder, 115 Meadowbrook Rd., Athens, Ga. 30606

[21] Appl. No.: 556,506

[22] Filed: Jul. 24, 1990

[51] Int. Cl.⁵ .................................... A47G 33/12
[52] U.S. Cl. ....................................... 47/40.5
[58] Field of Search .............. 47/66, 79, 40.5, 48.5, 47/59, 62

[56] References Cited

U.S. PATENT DOCUMENTS

| | | | |
|---|---|---|---|
| 2,145,052 | 1/1939 | Lund | 47/62 |
| 2,733,032 | 1/1956 | Farley et al. | |
| 2,817,956 | 12/1957 | Young | 47/79 |
| 2,938,304 | 5/1960 | Thomas et al. | |
| 3,329,380 | 7/1967 | Graves et al. | 47/40.5 |
| 4,653,224 | 3/1987 | Weckesser | 47/79 |
| 4,825,587 | 5/1989 | Stancil | |
| 4,850,137 | 7/1989 | Foster | |

Primary Examiner—David A. Scherbel
Assistant Examiner—Michele A. Van Patten
Attorney, Agent, or Firm—David H. Semmes

[57] ABSTRACT

An irrigation device, particularly a tree-supporting enclosure and adjacent float reservoir which automatically feeds liquid to the tree-supporting enclosure, as liquid level is depleted. The device is characterized by a pivoted valve housing which is supported in the wall of the float reservoir. A float extends inwardly from the valve housing to engage liquid in the float reservoir. As the liquid is depleted, the float and valve housing are pivoted to open an inlet conduit, thereby feeding additional liquid to the float reservoir.

5 Claims, 5 Drawing Sheets

CHRISTMAS TREE STAND AND IRRIGATION DEVICE

BACKGROUND OF THE INVENTION

1. Field of Invention

Christmas tree stands, particularly tree-supporting stands which provide an enclosed liquid feeding cavity, so as to irrigate the tree.

2. Description of the Prior Art

Farley et al.: U.S. Pat. No. 2,733,032
Thomas et al.: U.S. Pat. No. 2,938,304
Weckessers: U.S. Pat. No. 4,653,224
Stancil: U.S. Pat. No. 4,825,587
Foster: U.S. Pat. No. 4,850,137

The aforelisted patents suggest tree stands with liquid feeding cavities. However, such tree stands are mechanically complex and require pumps or lifting devices in order to admit water to the liquid-feeding cavity.

SUMMARY OF THE INVENTION

According to the present invention, a Christmas tree stand and irrigation device includes a low-profile tree-supporting enclosure having a base with convergent sides, so as to define an upper aperture engagable with the sides of a tree trunk supported within the enclosure. A plurality of ground engaging lateral braces extend from the enclosure sides. A float reservoir is positioned adjacent and communicant with the tree-supporting enclosure. A valve housing is pivotally supported at one side of the float reservoir and is communicant with an external source of liquid. The valve housing includes a float extending inwardly of the float reservoir, a compressible valve seat and a feeding valve which defines a conduit extending through the sides of the reservoir at one end and engages the compressible valve seat at the other end. Accordingly, as liquid is depleted within the float reservoir and the valve housing and float are pivoted downwardly, water is admitted through the feeding conduit to replenish the reservoir and the tree-supporting enclosure.

DESCRIPTION OF THE PREFERRED EMBODIMENTS

Figure 1:
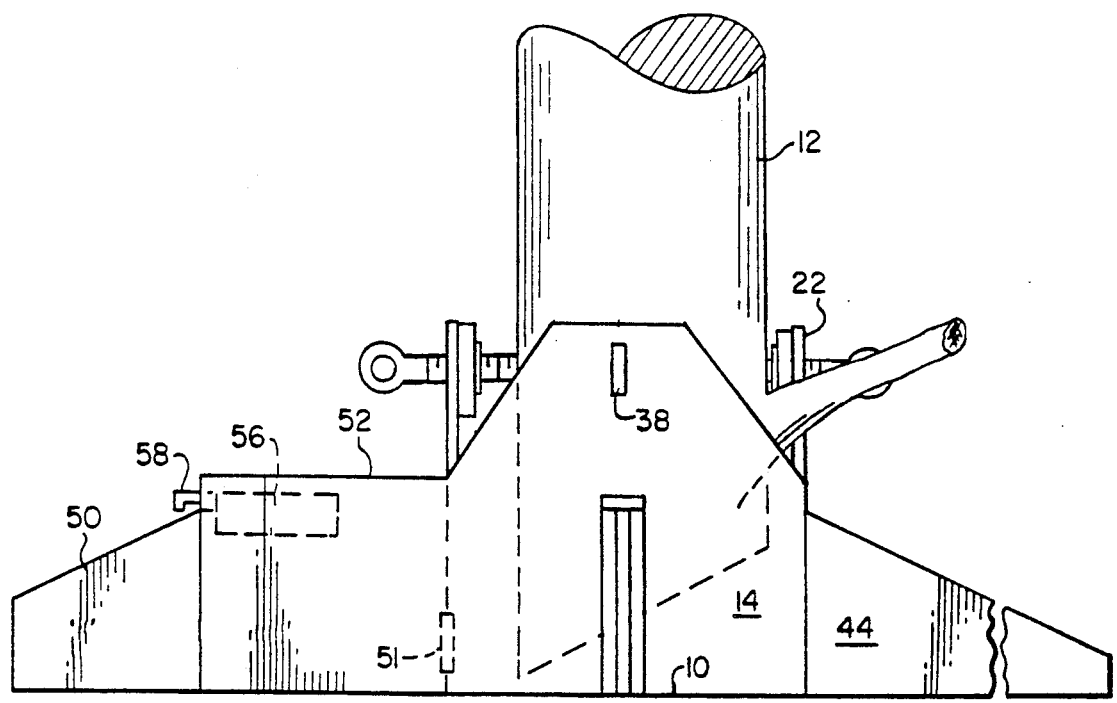
FIG. 1 is a side elevation of the tree-supporting enclosure with adjacent float reservoir and laterally extending, ground engaging braces.

In FIG. 1 a Christmas tree stand and irrigation device is illustrated as including tree-supporting cavity or enclosure 10 having upstanding sides 14, 16, 18 and 20 defining a top aperture 22 which includes the sides of an upstanding cut Christmas tree 12, or the like. Manifestly, the same basic structure may be employed to define a triangular or polygonal enclosure.

Figure 2:
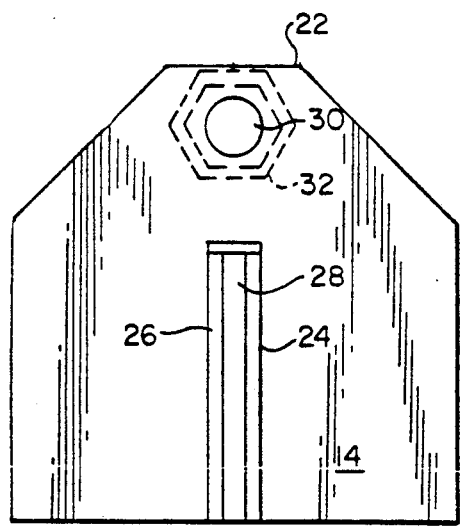
FIG. 2 is a side elevation of an upstanding side 14 of the tree-supporting enclosure showing slot 28 for support of the lateral braces and aperture 30 for support of the tree engaging eye bolts.
Figure 3:
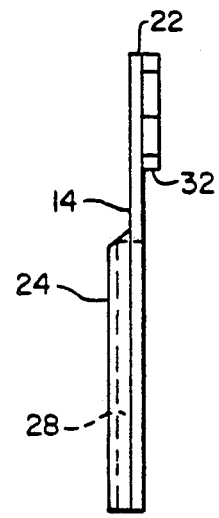
FIG. 3 is a end view of the upstanding side of FIG. 2.
Figure 4:
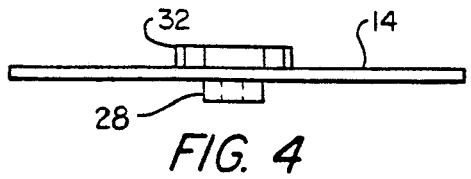
FIG. 4 is a top plan of the upstanding side as in FIGS. 2 and 3.

In FIGS. 2, 3 and 4, the individual sides, such as 14 are illustrated as including vertical brace slot 28 defined by molded ribs 26, 24, and similar bolt supporting apertures 30 defined on each side with nut engaging aperture 32.

Figure 5:
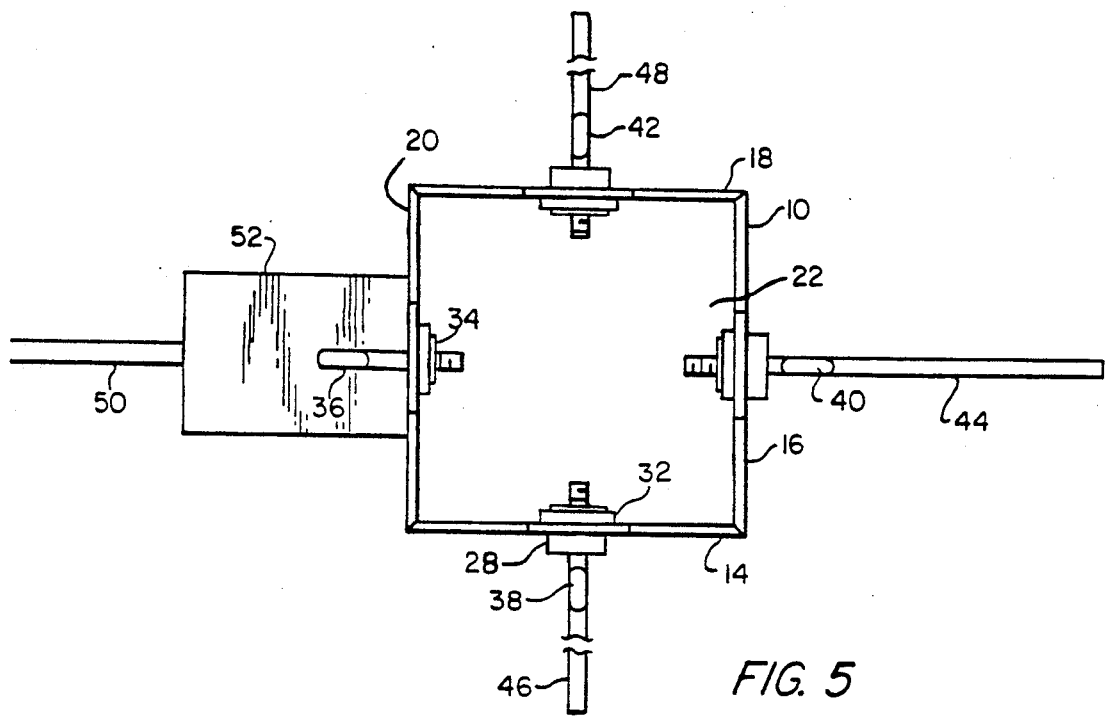
FIG. 5 is a top plan of the device, showing the tree engaging eye bolts 36, 38, 40 and 42 extending through the upstanding sides of the tree engaging enclosure.

As illustrated in FIG. 5, eye bolts 36, 38, 40 and 42 are extensible through the convergent sides so as to be secured by identical nuts 34, while the individual eye bolt ends engage the sides of supported tree 12.

Float reservoir 52 is positioned adjacent and communicant with tree cavity 10, such that the liquid in float reservoir 52 flows freely by one or more apertures 51 into the enclosure 10. Float reservoir 52 may have a top closure (not illustrated). Float 60 is supported by inner angular struts 62, 64 of feeding housing valve 58 which, in turn, is extensible through the sides of reservoir 52 and is pivoted upon feeding conduit 74 pins 76.

As illustrated in FIG. 1, a laterally extending brace 50, similar to brace 44 may be supported at one or more sides of float reservoir 52.

Figure 6:
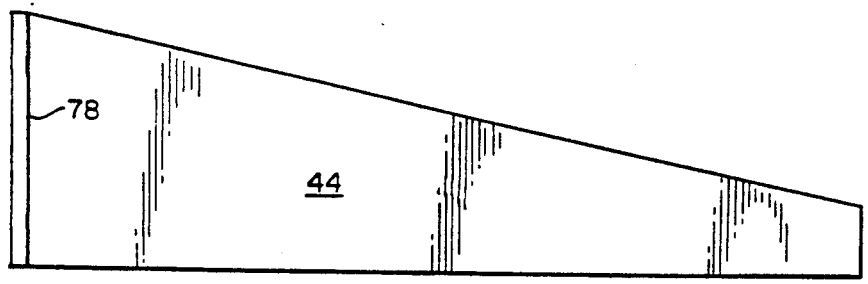
FIG. 6 is a fragmentary side elevation of the lateral brace with its T-shaped end.
Figure 7:
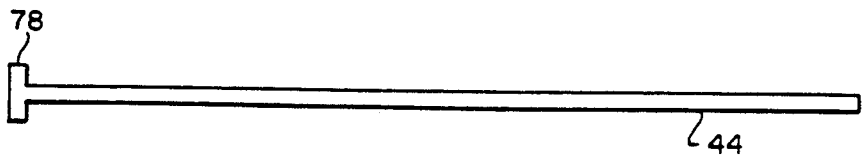
FIG. 7 is a fragmentary top plan of the lateral brace.

In FIGS. 6 and 7, lateral brace 44 is illustrated as typical of the braces, including a T-edge 78 engagable with the slot 28 defined in the upstanding convergent sides 14, 16, 18, as well as the side of reservoir 52.

Figure 8:
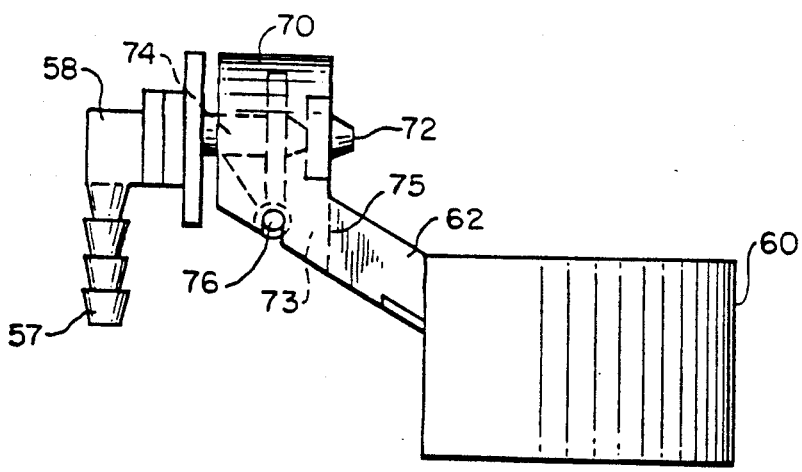
FIG. 8 is a side elevation of the pivoted float valve housing with float 60 extending laterally inwardly thereof.
Figure 9:
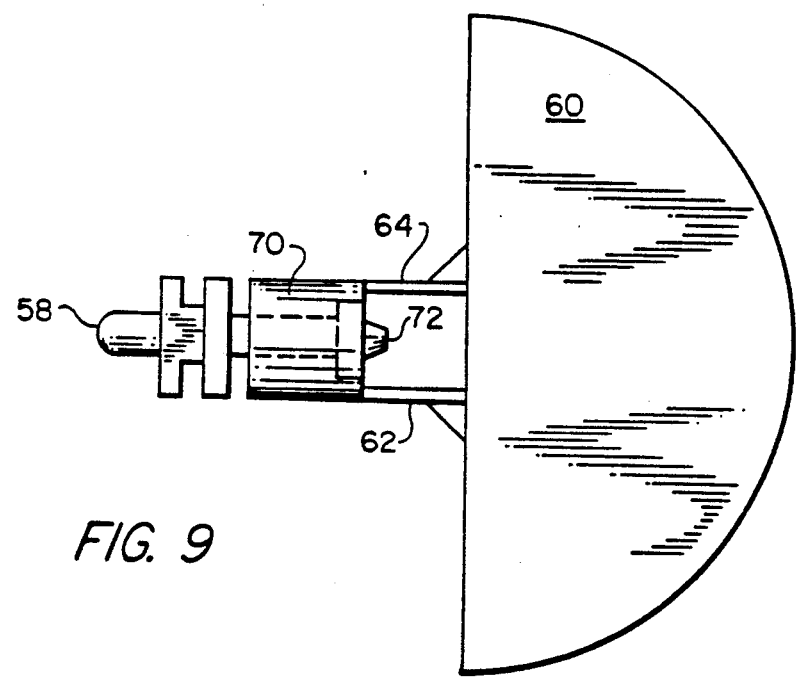
FIG. 9 is a top plan of the float valve housing.
Figure 10:
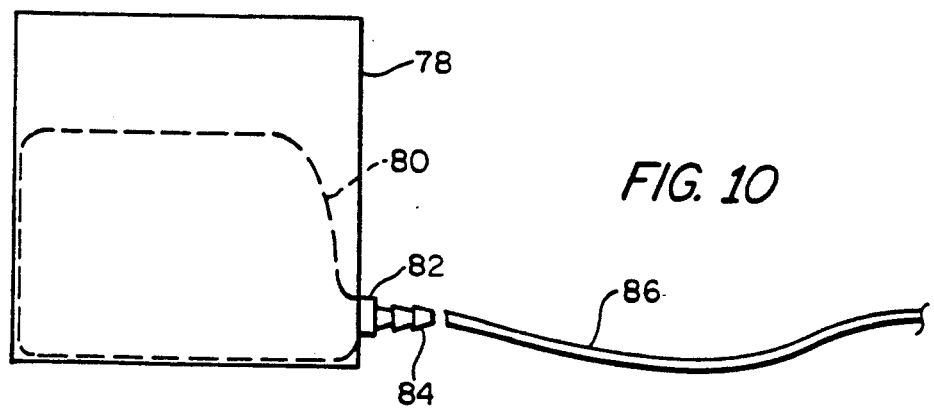
FIG. 10 is a side elevation of collapsible container 80 serving as a source of liquid for the float reservoir.
Figure 11:
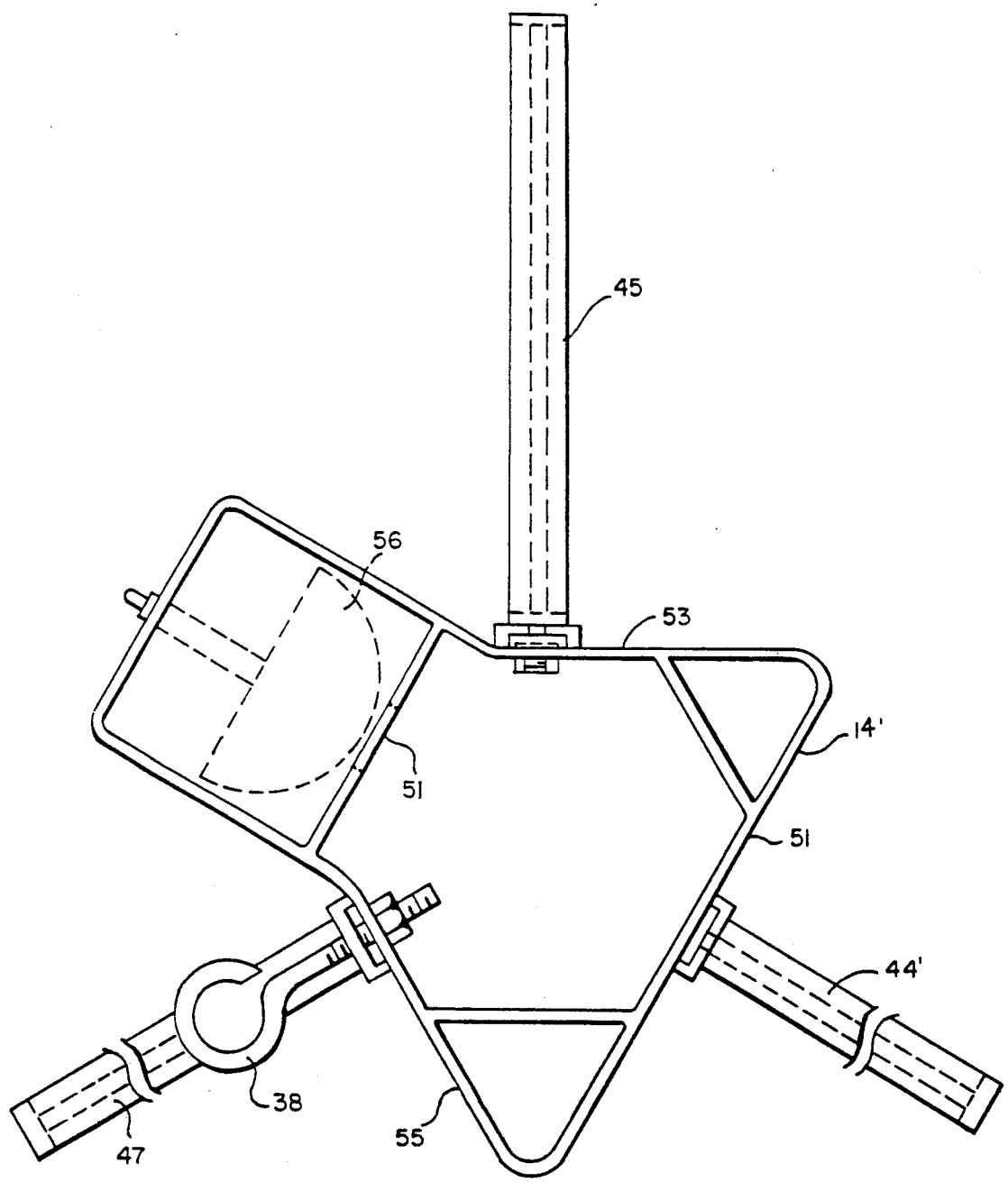
FIG. 11 is a top plan of a modified tree-supporting enclosure 14' with adjacent float reservoir.

In FIGS. 8 and 9, the feeding valve assembly is illustrated as including valve housing 70 with angular struts 62, 64 supporting float 60. A pivot seat 75 is defined at the bottom of valve housing 70, so as to engage pins 76 which extend laterally from the inner end of feeding conduit 74. A water inlet chamber 73 is defined by inner wall 77. A compressible valve seat 72 is supported at one end of chamber 70. Feeding valve 58 outer end includes a threaded downwardly extending portion 57 engagable with a feeding tube or the like 86, as illustrated in FIG. 10. The inner end 74 of the feeding valve defines a water inlet conduit which is engagable with compressible valve seat 72, so as to stop the flow of the water as the float valve is raised or pivoted upwardly by the rising water level in float reservoir 52.

As illustrated in FIG. 10, a source of liquid, such as collapsible container 80, may be supported in a box or decorative enclosure 68 such that a feeding tip 84 extends through aperture 82 to engage the feeding tube or conduit 86 which at its other end engages the extended valve end 57.

In FIGS. 11-14 there is illustrated the modified tree-supporting enclosure 14' and float reservoir 52'. In this modification, the three lateral braces 44', as well as 45 and 47 are shown as extending from sides 51, 53 and 55 of modified enclosure 14' which is in the form of a polyhedron.

Figure 12:
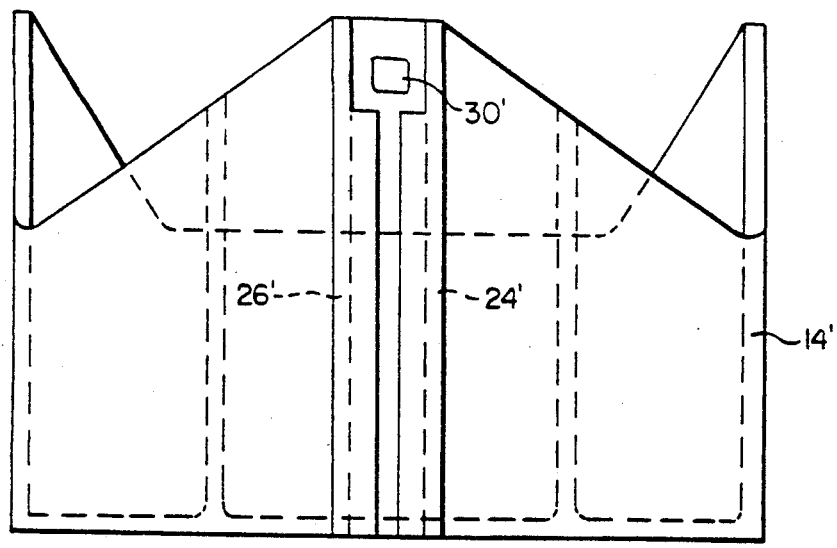
FIG. 12 is a front elevation of the modified tree-supporting enclosure.
Figure 13:
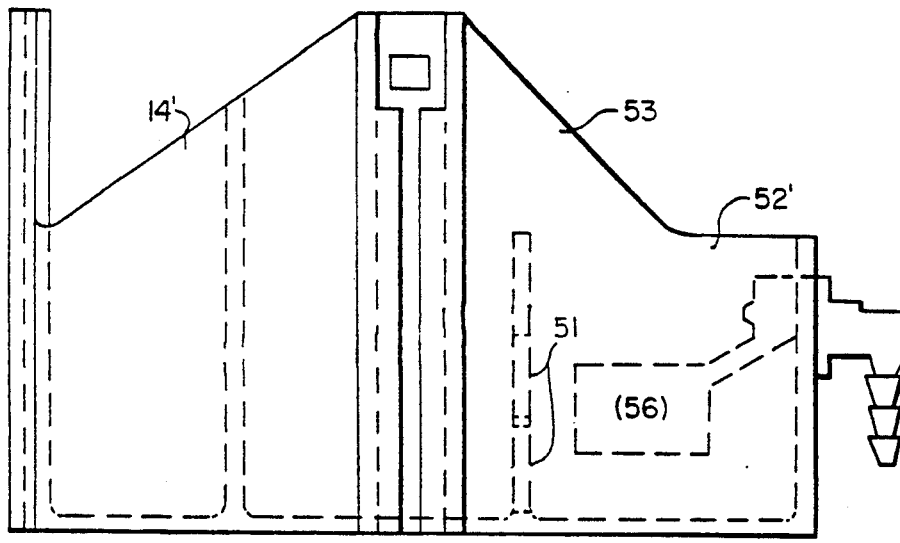
FIG. 13 is a side elevation of the modified tree-supporting enclosure and adjacent float reservoir with float (56) shown in phantom.
Figure 14:
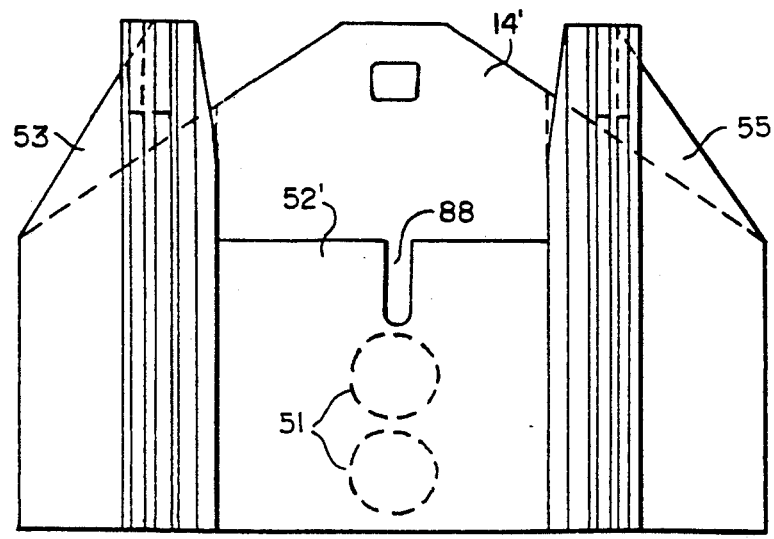
FIG. 14 is a rear elevation thereof, showing the modified float reservoir 52' with slot 88 for sliding engagement with feeding valve 58.

In FIGS. 12-14, the modified enclosure 14' and reservoir 52' is shown absent the laterally extending braces and with the respective slots for supporting the lateral braces being shown in elevation and phantom line.

As will be apparent, the present invention may support a Christmas tree or more particularly a portion of a cut tree, so that the tree may be irrigated with water. As shown in FIG. 1, the small lower branches of the tree may extend freely between the trunk 12 and the upstanding sides 14. It should be understood that "water" is meant here to include, in addition to plain water, nutrients, preservatives and fire-retardant solutions.

Heretofore, many Christmas tree stands and holders have been offered, which when tree is positioned therein may hold a small portion of water in a tree-supporting cavity and which may be disassembled for storage. However, since cut trees may absorb as much as four quarts of water daily, exposure of the cut tree for just a few hours without water causes the tree base to scab with sap, which dramatically reduces the amount of water that can be absorbed thereafter. Thus, keeping cut trees sufficiently irrigated requires near constant liquid replenishment of the tree-supporting cavity.

Advantages of the present device include: convenient and automatically controlled tree irrigation; easy detection of water level in the tree-supporting enclosure; capability of automatically feeding a large volume of water to the tree without overfilling of the reservoir; easily replaceable parts, thereby adding to the life of the product and, also, the convenience of using less floor area under the tree, since the reservoir utilizes a much smaller tree supporting enclosure, as well as float valve and gravity concept instead of a siphon or purging action. The low profile of the device enables support and irrigation of a tree without disfigurement through pruning or removing the lower branches.

I claim:

1. A Christmas tree stand and irrigation device comprising:
   a. A tree-supporting enclosure, including a base with convergent upstanding sides, defining an upper aperture encircling the sides of a tree trunk supported within the enclosure, said sides defining vertical slots and including a plurality of tree engaging bolts extending through the sides to engage the sides of a tree supported within said aperture;
   b. A plurality of lateral braces engagable with with said vertical slots and extending from the sides of said enclosure, so as to engage a lower supporting surface;
   c. A float reservoir including a base and upstanding sides supported adjacent and communicant with said tree-supporting enclosure;
   d. A valve housing communicant with a source of liquid and pivotably supported at a side of said float reservoir and further including:
      i) a float extensible inwardly from said valve housing and engagable with liquid held within the float reservoir;
      ii) a compressible valve seat supported at an inner end of said valve housing, and;
      iii) a feeding valve extending from outside of said float reservoir and into said valve housing in alignment with said compressible valve seat, said feeding valve defining an inlet conduit extending through the side of said float reservoir at an outer end and sealingly engagable with said compressible valve seat at its inner end, as liquid in said reservoir engages enters through said conduit to engage said float and pivot upwardly said valve housing supported upon the inner end of the valve inlet conduit.

2. A Christmas tree stand and irrigation device as in claim 1, including a laterally extending brace removably supported in an exterior side of said reservoir.

3. A Christmas tree stand and irrigation device as in claim 1, said source of liquid being positioned to gravity feed liquid through said pivoted valve.

4. A Christmas tree stand and irrigation device as in claim 3, including conduit means extending from said source of liquid to said feeding valve.

5. A Christmas tree stand and irrigation device as in claim 4, said source of liquid being in the form of a collapsible container.

* * * * *